US010862968B2

(12) United States Patent
Graefe et al.

(10) Patent No.: US 10,862,968 B2
(45) Date of Patent: Dec. 8, 2020

(54) SENSOR DATA SEARCH PLATFORM

(71) Applicant: Intel IP Corporation, Santa Clara, CA (US)

(72) Inventors: Ralf Graefe, Feldkirchen (DE); Damian Kelly, Naas (IE)

(73) Assignee: Intel IP Corporation, Santa Clara, CA (US)

(*) Notice: Subject to any disclaimer, the term of this patent is extended or adjusted under 35 U.S.C. 154(b) by 880 days.

(21) Appl. No.: 15/088,976

(22) Filed: Apr. 1, 2016

(65) Prior Publication Data

US 2017/0289253 A1    Oct. 5, 2017

(51) Int. Cl.
*H04L 29/08*    (2006.01)

(52) U.S. Cl.
CPC .............. *H04L 67/12* (2013.01); *H04L 67/02* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 6,285,999 B1 | 9/2001 | Page | |
| 2005/0021712 A1* | 1/2005 | Chassapis | G08C 17/00 709/223 |
| 2007/0240173 A1* | 10/2007 | McCoy | H04L 12/2816 719/329 |
| 2011/0252038 A1* | 10/2011 | Schmidt | G06F 16/90 707/741 |
| 2012/0197911 A1 | 8/2012 | Banka et al. | |
| 2014/0351790 A1 | 11/2014 | Ghose et al. | |
| 2014/0359552 A1 | 12/2014 | Misra et al. | |
| 2015/0134954 A1 | 5/2015 | Walley et al. | |
| 2015/0381737 A1 | 12/2015 | Quinn et al. | |

FOREIGN PATENT DOCUMENTS

WO    2017172134    10/2017

OTHER PUBLICATIONS

Jirka et al. "Discovery Mechanisms for the Sensor Web", Sensor, 2009, 9, 2661-2681 (Year: 2009).*
"International Application Serial No. PCT US2017 019125, International Preliminary Report on Patentability dated Oct. 11, 2018", 9 pgs.
"About Thingful", Thingful beta, [Online]. Retrieved from the Internet: <URL: https://thingful.net/site/about>, (Accessed on Aug. 8, 2016), 3 pgs.
"Home page", Hypercat, (Accessed on Jul. 19, 2016), 3 pgs.

(Continued)

*Primary Examiner* — Roy Y Yi
(74) *Attorney, Agent, or Firm* — Schwegman Lundberg & Woessner, P.A.

(57) ABSTRACT

Disclosed in some examples are methods, systems, and machine readable mediums which automatically generate standardized interfaces to sensor data consumers, provide sensor data search functionality, automatically determine data quality, and cache previously used sensor data to minimize the burden on application developers and minimize API call costs.

15 Claims, 8 Drawing Sheets

(56) References Cited

OTHER PUBLICATIONS

"Learn", All Seen Alliance, [Online]. Retrieved from the Internet: <URL: https://allseenalliance.org/framework/documentation/learn>, (Accessed: Aug. 2, 2016), 4 pgs.

"Open Interconnect Consortium", Wikipedia, the free encyclopedia, [Online]. [Archived Aug. 2, 2016]. Retrieved from the Internet: <URL: https://en.wikipedia.org/wiki/Open_Interconnect_Consortium>, (Accessed: Aug. 2, 2016), 2 pgs.

"OpenWeatherMap", Wikipedia, the free encyclopedia, [Online]. [Archived Aug. 2, 2016]. Retrieved from the Internet: <URL: https://en.wikipedia.org/wiki/OpenWeatherMap>, (Accessed: Aug. 2, 2016), 3 pgs.

Grossman, Adam, "Announcing Forecast", Forecast, [Online]. Retrieved from the Internet: <URL: http://blog.forecast.io/announcing-forecast/>, (Mar. 25, 2013), 6 pgs.

"International Application Serial No. PCT/US2017/019125, International Search Report dated May 23, 2017", 3 pgs.

"International Application Serial No. PCT/US2017/019125, Written Opinion dated May 23, 2017", 7 pgs.

"European Application Serial No. 17776152.5, Extended European Search Report dated Oct. 11, 2019", 7 pgs.

Akio, Sashima, "SENSORD Stat: Combining sensor middleware with a statistical computing environment", Networked Sensing Systems, INSS 5th International Conference on, IEEE, Piscataway, NJ, USA, (Jun. 17, 2008), 4 pgs.

"European Application Serial No. 17776152.5, Response filed Feb. 10, 2020 to Extended European Search Report dated Oct. 11, 2019", 14 pgs.

"European Application Serial No. 17776152.5, Communication Pursuant to Article 94(3) EPC dated Jun. 10, 2020", 5 pgs.

"European Application U.S. Appl. No. 17776152.5, Communication Pursuant to Article 94(3) EPC dated Jun. 10, 2020", 5 pgs.

* cited by examiner

SENSOR DATA SEARCH PLATFORM

TECHNICAL FIELD

Embodiments pertain to sensor data sources. Some embodiments relate to providing enhanced access to sensor data sources to applications.

BACKGROUND

The Internet of Things or "IoT" is a network of physical objects or "things" embedded in electronics, software, and sensors which enables these objects to collect and exchange data between themselves and between other computing devices. Example "things" include connected home appliances, sensors in automobiles, biochips, and the like.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Sensor data will play an important part of the IoT and it is expected that the number of sensor data sources will grow into the millions and beyond. Application developers attempting to make use of this sensor data must manually find, evaluate, and integrate them into their applications. For developers that wish to use IoT sensor data, finding suitable sensor data sources is time consuming as there is no automated way to search for this data. Additionally, once sensor data sources are found, there is no way to assess beforehand the quality and reliability of the data sources. Furthermore, the programming interfaces with these data sources are non-standardized and require time to program an application for each individual interface. For example, two popular weather sources: openweathermap.org and forecast.io both provide free weather data for developers, but use different APIs and data types. Discovering the sensor stream for a particular phenomenon associated with a particular location requires learning how to interact with each service, manually downloading, interpolating and visualizing each service's data and subjectively deciding which source is more accurate for the given location.

Figure 1:
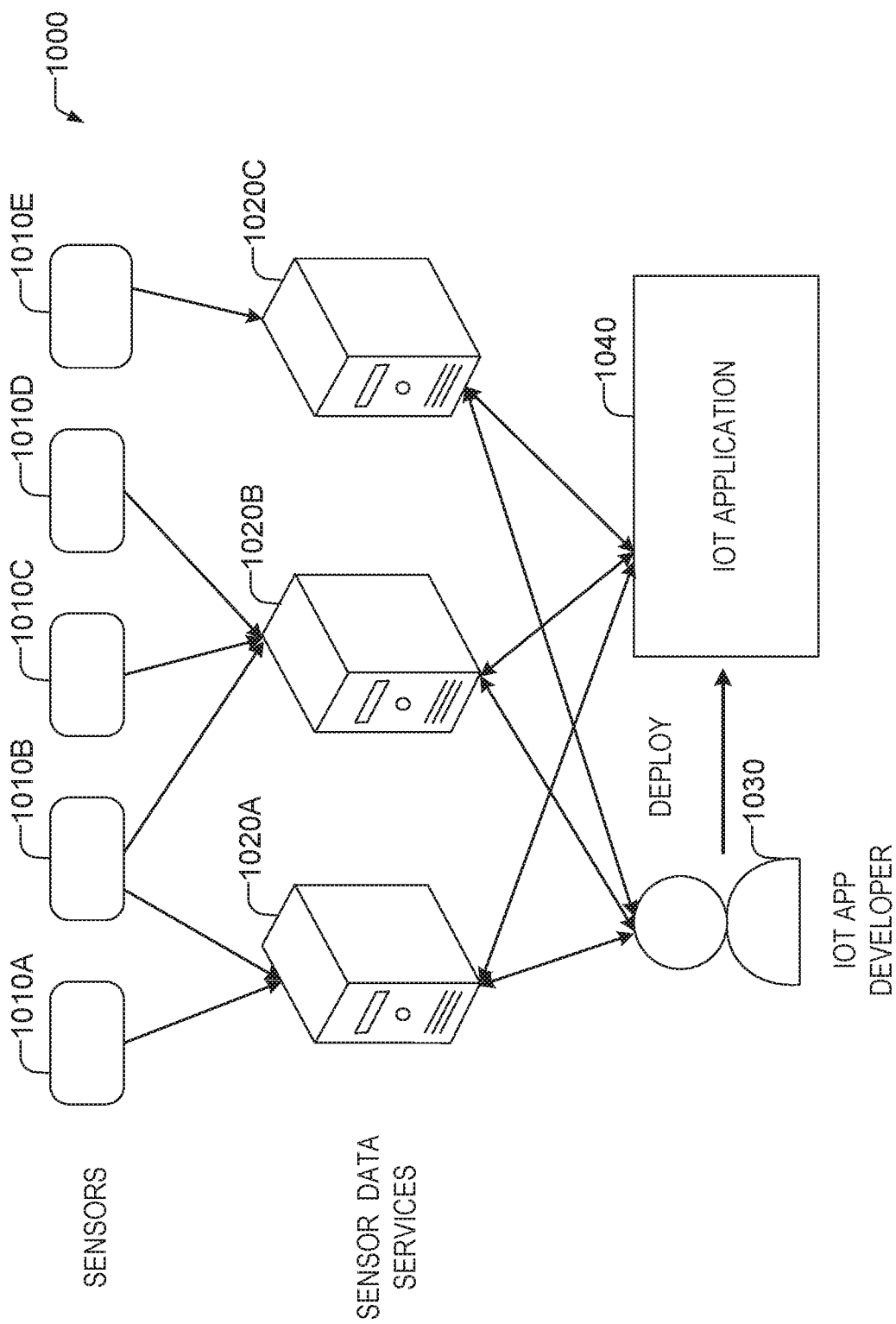
FIG. 1 shows a diagram of an IoT environment according to some examples of the present disclosure.

Turning now to FIG. 1, a diagram of an IoT environment 1000 is shown according to some examples of the present disclosure. IoT application developer 1030 manually finds the sensors 1010A-1010E and integrates their APIs into the IoT application 1040. In some examples, various IoT data services 1020A-1020C may provide programmatic access through one or more APIs to one or more sensors 1010A-1010E. In these examples, the IoT application developer 1030 manually finds the different sensor data services 1020A-1020C to obtain data from sensors 1010A-1010E and integrates their APIs into the IoT application 1040. As used herein, a sensor data source is used to refer to both sensors (e.g., 1010A-1010E) and sensor data services (e.g., 1020A-1020C). A sensor data source is a device or service that provides an interface to access sensor data from one or more sensors programmatically.

Disclosed in some examples are methods, systems, and machine readable mediums which automatically generate standardized interfaces to sensor data consumers, provide sensor data search functionality, automatically determine data quality, and cache previously used sensor data (e.g., sensor readings) to minimize the burden on application developers and minimize API call costs. This will provide a standardized, automatically generated, and customized interface to sensor consumers (e.g., IoT and other applications, and users) based upon sensor data search requests. The system may improve data quality by exploiting self-redundancy in the sensor stream and mutual-redundancy with other sensor streams. Performing data quality assessments at a central point also maximizes efficiencies by centralizing these assessments rather than offload them to each individual application. This may be especially beneficial where the IoT applications are executing on low-energy devices such as wearables. While the disclosed methods and systems are described with reference to the Internet of Things (IoT), one of ordinary skill in the art with the benefit of this disclosure will appreciate that the methods and systems are applicable to any type of data source which can be consumed by a third party system or user.

In some examples, users may register sensor data sources with a registration component of the system, providing information on the geolocation and API of the sensor. The API of the sensor data source specifies how the IoT service platform is to receive data from the sensor data source and what format that data is to be in. The IoT service platform may communicate with different sensors using different APIs. More formally, an application programming interface is a set of communication protocols specifying how two different software application interacts and exchanges data. The system may then receive sensor streams from the registered sensors, and monitor the data quality from these streams. The system may also provide a search functionality through either a user interface (such as a Graphical User Interface (GUI)) or programmatically through an Application Programming Interface (API) that allows applications or users to search for sensor data sources using search criteria supplied by the user or application. The user (either a person or an application) may select which of the sensor data source search results they are interested in. The system may then create a sensor data source list resource for the user or application and an address corresponding to this sensor data source list resource (e.g., a URL) is passed back to the application or user.

Anytime the application or user wishes to access the current sensor data (e.g., current sensor readings) of the selected sensor data source search results, the application or user requests the sensor data source list resource at the provided address. For example, the user or application may utilize a Representational State Transfer (REST) architecture style. When this sensor data source list resource is requested, the system provides the sensor values in a standardized format in response. The sensor data source list resource, thus stores a list of the sensor data sources, and a request for the sensor data source list resource does not return the actual sensor data source list resource but rather the sensor data from the sensor data sources in the list in a standardized format. The sensor data source list resource may be re-used, such that any time the application requests this sensor data source list resource, the up-to-date values of the previously selected sensor data sources are provided. In some examples, the sensor data may be retrieved at various intervals automatically by the system and cached for faster access. In some examples, the sensor data is sorted in the response based upon the data quality assigned to the data sources.

Figure 2:
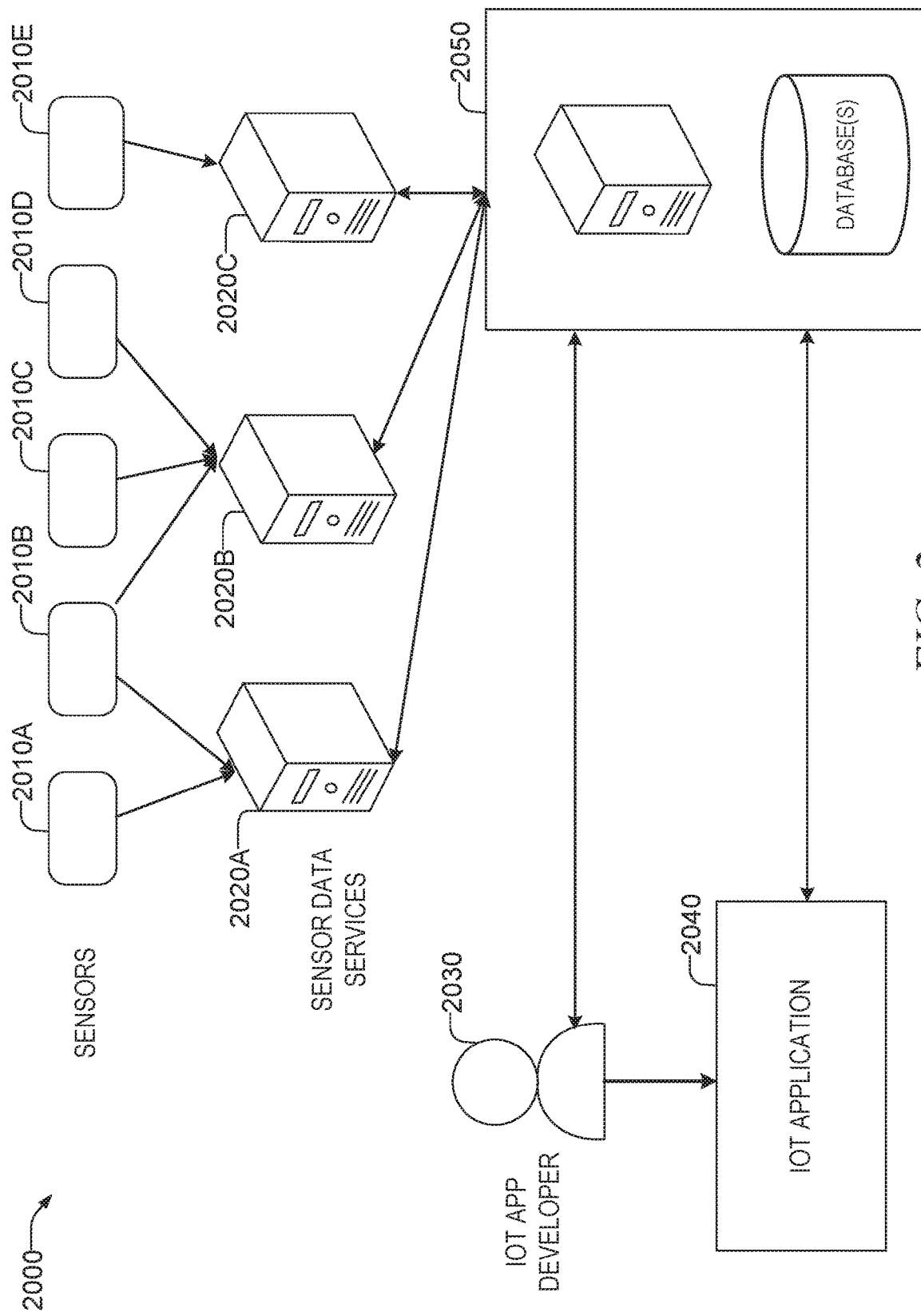
FIG. 2 shows a diagram of an improved IoT environment according to some examples of the present disclosure.

Turning now to FIG. 2, a diagram of an improved IoT environment 2000 is shown according to some examples of the present disclosure. Owners, operators, or other users of sensors 2010A, 2010B, 2010C, 2010D, 2010E, or sensor data services 2020A-C register the sensor data sources with IoT service platform 2050. During registration, the person registering the sensor data service may provide information on the format of the sensor data source. Application developer 2030 may use a UI (e.g., a GUI) or an API provided by the IoT service platform 2050 to submit criteria to search the sensor data sources registered to the IoT service platform 2050. IoT service platform 2050 provides a list of sensor data sources that match the criteria submitted by the IoT application developer 2030. The application developer 2030 may then select the desired sensor data sources and submit it to the IoT service platform 2050. The IoT service platform 2050 then creates a sensor data source list resource which records the sensor data source selections. The address corresponding to the sensor data source list resource is then provided to the application developer 2030. The IoT application 2040 may then utilize this address to request the sensor data source list resource. When the sensor data source list resource is requested at the provided address, the IoT service platform 2050 retrieves the sensor data corresponding to the selected sensor data sources. The sensor data may be retrieved from a cache at the IoT service platform, or may be requested from the sensor data sources over a network (in the case of remote sensor data sources) or requested through a local connection if the sensor data sources are local to the IoT service platform. The sensor data may be provided to the IoT application in a common format in response to the request for the sensor data source list resource. The IoT service platform 2050 converts the various formats of the sensor data into a common format using the format information learned during registration of the sensor data.

In some examples, the IoT service platform 2050 may receive streams of sensor data from sensor data sources (e.g., sensors 2010A-E or sensor data services 2020A-2020C). The IoT service platform may monitor this sensor data and assess the quality of the data. Quality may be measured using one or more quality measurements. For example, the IoT service platform may measure a sensor data source's network responsiveness and availability. For example, a response time, down time and the like. The response time may be determined by timing the time it takes to receive sensor data after a request has been sent. A sensor is considered to be offline, or "down" when it is not responsive to queries. This downtime may be recorded and stored for later use in quality measurements.

Additionally, the IoT service platform may measure a quality of the actual data provided by the sensor data source. For example the IoT service platform may compare the value reported by the sensor to an expected value of the sensor. The expected value of the sensor may be calculated in a number of ways. For example, as part of the registration process the GPS locations of the sensor data sources may be provided to the IoT service platform. The IoT service platform may compare the values reported from the same or similar types of sensors in nearby locations. In these examples, the expected value may be the average value of the nearby sensors and the sensor reading from the sensor data source may be considered acceptable if it is within a predetermined range of this average value. In some examples, nearby sensors are sensors that are within a predetermined distance of the sensor. The predetermined distance may be applicable to all sensor types, or the predetermined distance may be specific to a particular type of sensor. For example, temperature sensors may have a different predetermined distance than humidity sensors.

In some examples, for spatially distributed signals, the IoT service may calculate the expected value using a nearest subset of signals from similar types of sensors and spatially interpolate the signals (e.g., using Kriging, Gaussian Process Interpolation, and the like) over time to establish an expected value. In other examples, the IoT service platform may utilize a sensor's own historical data to determine an expected value. For example, for time dependent signals, forecasts of the maximum likelihood signal and probabilistic distribution at a given time can be estimated from historical data. The quality can be calculated either from the distance of new samples from the maximum likelihood prediction or from the probability of the new sample occurring given historical data. For signals that are both temporally and spatially varying a combination of the above may be utilized.

An overall quality metric may be calculated by utilizing one or more of the above quality measures in a weighted sum calculation. The weights for each of the individual quality measures may be predetermined by an administrator of the IoT service platform. For example, a sensor response time subscore may be calculated that is the difference between a predetermined acceptable response time and the sensor's response time. A down time subscore may be calculated which may be the difference between a predetermined acceptable down time and the sensor's down time. One example quality metric may be determined based upon the formula: Quality=w1*down time subscore+ w2*response time subscore+w3*(sensor value−expected value), where the expected value is calculated according to one of the above methods. In some examples, the quality metric formulation may be different and the weights given to each subscore may be different for each type of sensor.

The quality score may be updated every time the IoT service platform gets a new sensor reading, every predetermined time interval (calculated based upon all the sensor readings received since the last quality measurement), or the like. The quality score may be saved with the sensor data. Long term quality trends may also be analyzed to determine changes in the quality scores over time. Sensor data sources that have quality scores that are below a predetermined threshold for a predetermined amount of time may be de-registered to maintain data quality provided by the IoT service platform. In some examples, when a sensor data source is registered, an email address or other contact method is provided. The IoT service platform may utilize this contact information to contact the user who registered the sensor data source to inform them of a poor quality score. Requests for sensor data source list resources that include the de-registered sensor data source may return an error, a best match sensor data source, or a predetermined value to indicate that the sensor data source has been deregistered. The best match sensor data source may be a sensor data source that is geographically within a predetermined distance of the deregistered sensor data source and of the same type.

Figure 3:
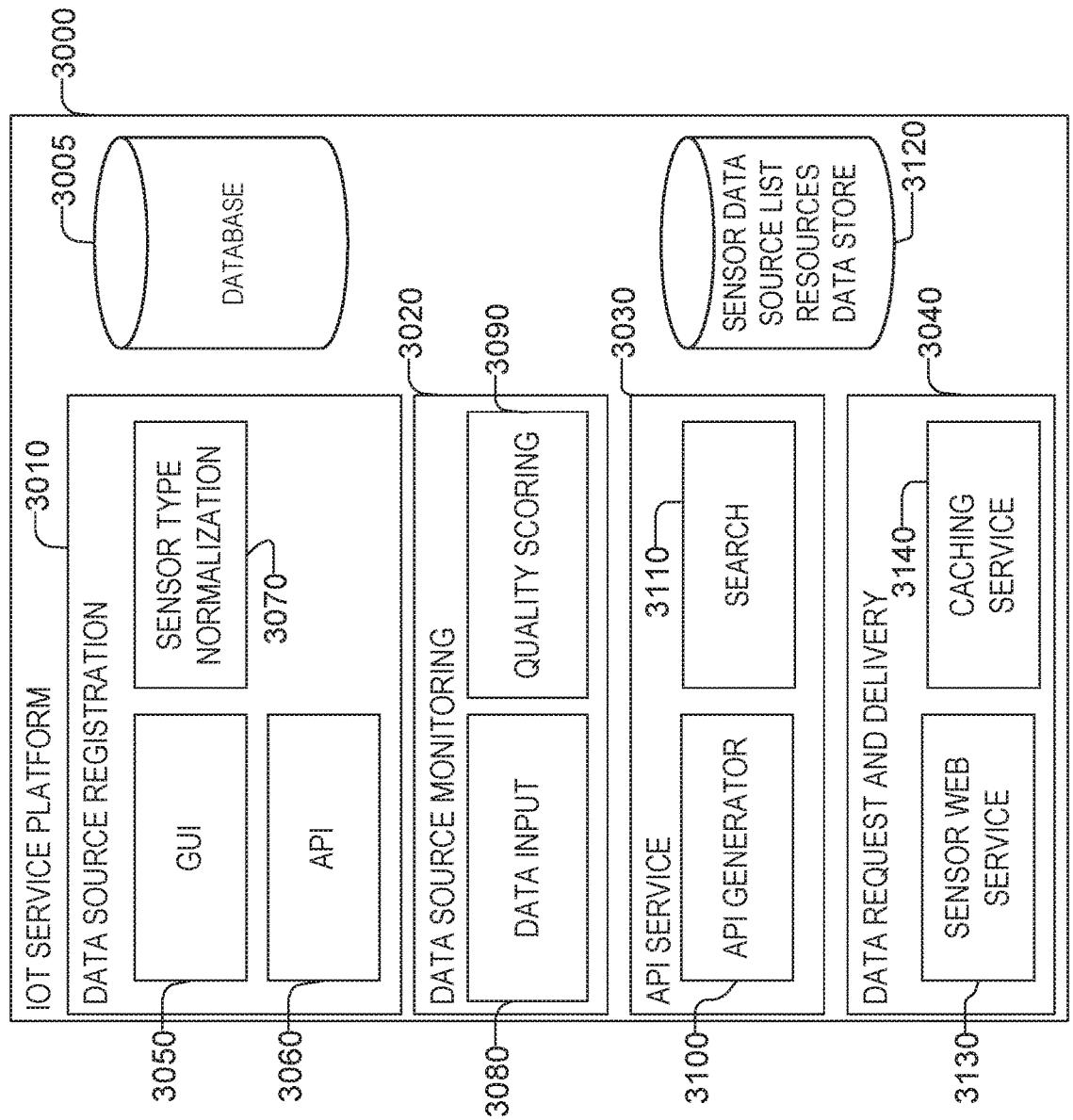
FIG. 3 shows a block diagram of an IoT service platform according to some examples of the present disclosure.

Turning now to FIG. 3, a block diagram of an IoT service platform 3000 is shown according to some examples of the present disclosure. IoT service platform may be a network-based (e.g., cloud based) service that executes on a server and is accessible over a network. IoT service platform 3000 may be executing on a single machine or a distributed collection of interoperating machines. IoT service platform 3000 contains data source registration component 3010, data source monitoring component 3020, API service 3030, and data request and delivery component 3040. Components shown are exemplary and the functions of each may be performed by different components shown, or components not shown.

Data source registration component 3010 may have a GUI component 3050 which may provide one or more GUIs to one or more users to facilitate the registration of a sensor data source. The GUI may include one or more forms with fields that the user may fill out to register the data source. The GUI may be provided to a computing device of the user in the form of a HyperText Markup Language (HTML) file or other data descriptor. In other examples, the GUI may be provided by an application on the computing device of the user in conjunction with data sent by GUI component 3050. API component 3060 may provide one or more application programming interfaces (API)s which allow applications to call one or more functions corresponding to data source registration component 3010 to allow an application or user to programmatically register a sensor data source without interacting with a GUI. Data source registration includes providing the remote address (e.g., Universal Resource Locator—URL) of the sensor data source, details about the offered sensor data, the geolocation of the sensor data, and the like. The registration information about the sensor data source is stored in database 3005. When registering a sensor data source, sensor type normalization component 3070 may verify the availability of the data source and normalize the names of the sensor types. For example, during registration, data source registration component 3010 may provide a predetermined list of available sensor type choices. But, in other examples, data source registration component 3010 may allow a user that is registering the component to specify the type (e.g., an open text input field). This user entered data type is converted into a standard data type to allow for easy searching by type, use in calculating data quality scores, and the like. This standardization may be done by matching the text input by the user using one or more fuzzy matching algorithms with the standardized list of sensor types. In some examples, the user entered text input is compared with each of the standardized list of sensor types and scored based upon how many string operations are necessary to convert the name entered by the user into the current standardized type. The sensor data source may be assigned the standardized type with the lowest score, assuming that the score is below a predetermined threshold. If the score is not below the predetermined threshold, then the user entered text may create a new sensor data type.

Data source monitoring component 3020 may include a data input component 3080 which may request and receive sensor data streams and quality scoring component 3090 which may score a data source based upon the quality of the sensor data as previously described. The data input component 3080 may utilize different APIs for each sensor data source as provided for in the registration information. Data received by the data input component 3080 may be cached for later use (e.g., by data request and delivery component 3040) in a database 3005. The data input component 3080 may automatically receive the sensor data streams from the sensor data sources, or may periodically poll the sensor data sources for the streams.

API service 3030 may include search component 3110 which may provide one or more Graphical User interfaces (GUI) or APIs to client computing devices (e.g., computing devices of the developer of an IoT application, a computing device of a user of an IoT application, and the like) to facilitate a search of registered sensor data sources based upon one or more criteria submitted by users. A GUI may be provided to client computing devices in the form of one or more client renderable user interface descriptors. Examples include one or more HyperText Markup Language (HTML) files, Content Style Sheets, JavaScript files, and the like. Upon receipt of a search request, database 3005 is searched for sensor data sources that match the supplied criteria. The matching sensor data sources may be communicated back to the user through the GUI or API. In some examples, the sensor data sources in the response may be ordered based upon the quality scores of the sensor data sources, for example, a highest (e.g., best) quality score first. The user or application may then communicate a selection of one or more of the returned sensor data sources (or all the returned sensor data sources) to API Generator component 3100 which may create a network based resource and an address for the network based resource. The sensor data source list resource specifies the selected sensor data sources. The sensor data source list resources are stored in the sensor data source list resources data store 3120.

Data request and delivery component 3040 may include a sensor web service 3130 that responds to requests for the sensor data source list resources stored in sensor data source list resources data store 3120. Upon receiving a request for a sensor data source list resource at a particular address (e.g., "http:\\iotserviceplatform.com\xyzabcdefg1234") the sensor web service 3130 locates the sensor data source list resource that matches this address in sensor data source list resources data store 3120. The sensor data source list resource stores the list of selected sensor data sources. Sensor web service 3130 then checks the caching service 3140 for the sensor data corresponding to the selected sensor data sources indicated in the sensor data source list resource. Sensor data not found in the caching service, or that is too old, is requested from the sensor data source through data input component 3080. Once all the requested sensor data is retrieved, the sensor web service 3130 returns a response with the collected sensor data. Caching service 3140 caches sensor data obtained from previous requests and data input component 3080 in the database 3005. Sensor data stored in the cache is aged by caching service 3140 such that sensor data above a predetermined age is flushed out of the cache to make room for new sensor data. The predetermined age may be independent of sensor type, or may take into consideration the sensor type (e.g., certain sensor data for certain types of sensors may be valid for longer periods of time than others).

Figure 4:
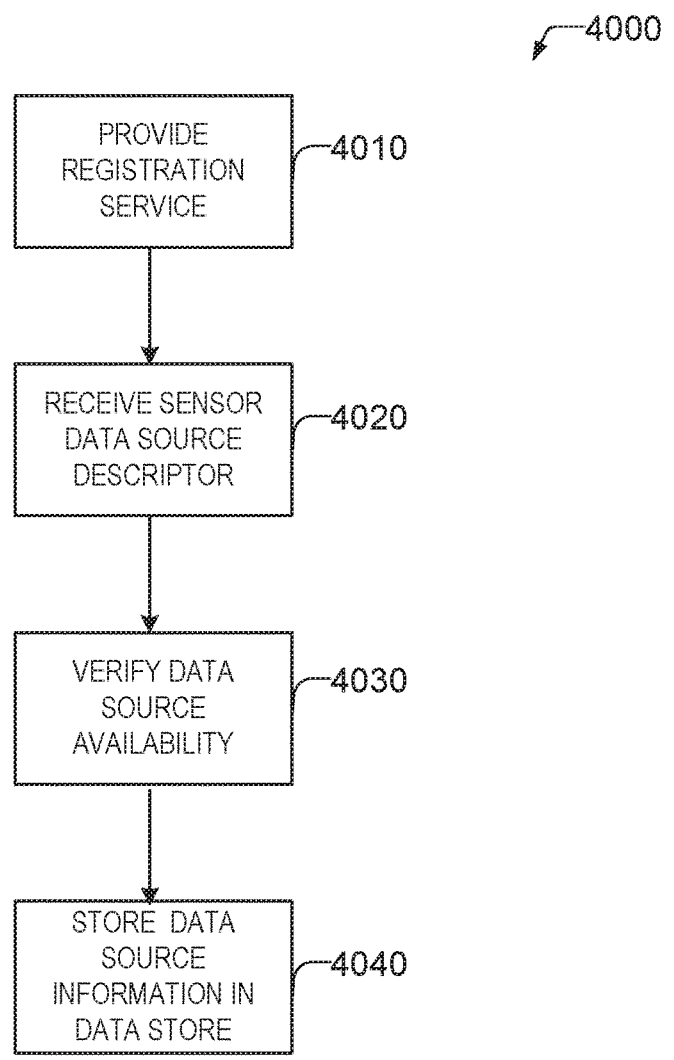
FIG. 4 shows a flowchart of a method of registration of a sensor data source according to some examples of the present disclosure.

Turning now to FIG. 4 a flowchart of a method 4000 of registration of a sensor data source is shown according to some examples of the present disclosure. At operation 4010 the system provides the registration service. The registration service may be GUI based, or may be API based. For example, the system provides one or more data files to a computing device of a user to build a GUI or other interface to allow for registration. At operation 4020 the registration service receives a data source descriptor. For example, upon filling in one or more information fields in the GUI, the user may hit a "submit" button or other GUI element and the information may be submitted, and received by the IoT sensor service as a sensor data source descriptor. The sensor data source descriptor contains information about the sensor data source including one or more of: a network address (e.g., IP Address or web-address), details about the data provided by the data source (e.g., what type of data is provided, how frequently it is updated, the units (e.g., Fahrenheit or Celsius, inches or meters) of the data, a geolocation of the data source, an API of the data source, and the like.

At operation 4030 the IoT service platform may verify the registration by contacting the sensor data source using the information in the sensor data source descriptor and checking the information provided. If the data source is reachable and the information provided in the data source descriptor is accurate, then the sensor name is normalized and the data source descriptor is stored in a data store (e.g., such as database 3005) at operation 4040. In some examples, an index of the data source descriptors is created and stored in the data store and updated when a new data source descriptor is added. The index is used for quickly searching for data source descriptors.

Figure 5:
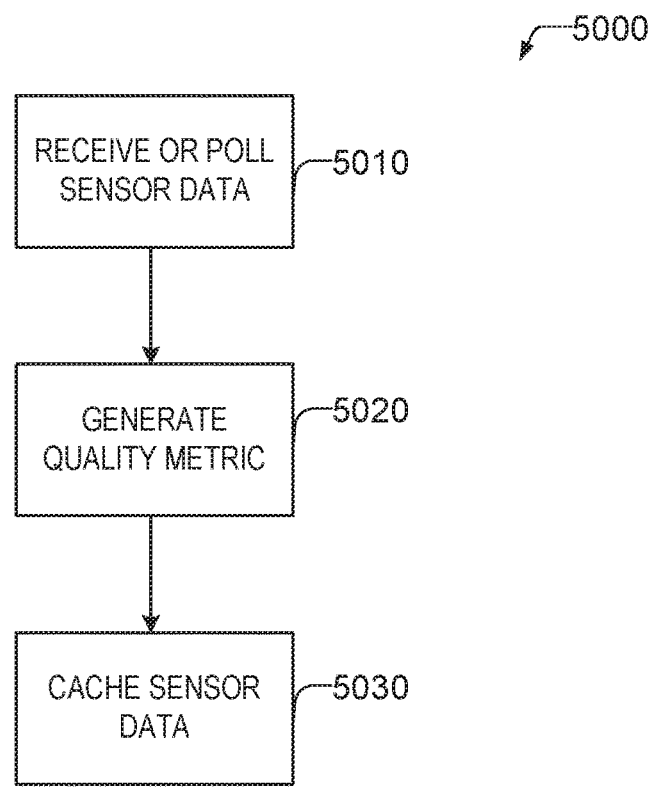
FIG. 5 shows a flowchart of a method of receiving sensor data from a data source according to some examples of the present disclosure.

FIG. 5 shows a flowchart of a method 5000 of receiving sensor data from a data source according to some examples of the present disclosure. At operation 5010 the IoT service may receive or poll for sensor data. For example, some sensor data sources may send a stream of data to subscribed entities at regular intervals. For these sensor data sources, during registration, the IoT service platform may register to receive this data stream. In other examples, some data sources only send data when polled. In these examples, the IoT service may poll the data sources at a predetermined interval. In some examples, this interval may be set when the data source is registered by the user registering the data source. In other examples it is a predetermined value programmed into the IoT service. The sensor data may include one or more sensor values. A timestamp may be included by the sensor data source or associated with the sensor data based upon the time the data was received from the sensor data source. Once the data is received, it may be mapped to the geolocation of the sensor data source and the type of sensor data source as defined in the registration. One or more other contextual properties may be specified during registration or received by the IoT service from the sensor data source.

At operation 5020 the IoT service may generate a quality metric corresponding to the data. As already noted, quality may be based upon a number of factors. For example, for sensors that are polled at regular intervals, one component of a quality score may be the response time. Larger response times indicate a lower quality sensor data source. For sensors that send a stream of data, a regular stream of sensor readings may indicate quality as opposed to more staggered and unpredictable sensor readings. Additionally, as noted an actual value may be compared to a predicted sensor value to determine quality of the sensor readings. As previously noted, a variety of quality metrics may be combined to produce a quality score. At operation 5030 the system may cache the sensor data for easy recall for use in updating the data source's quality metric the next time data is received, or to fulfill a request for the sensor data.

Figure 6:
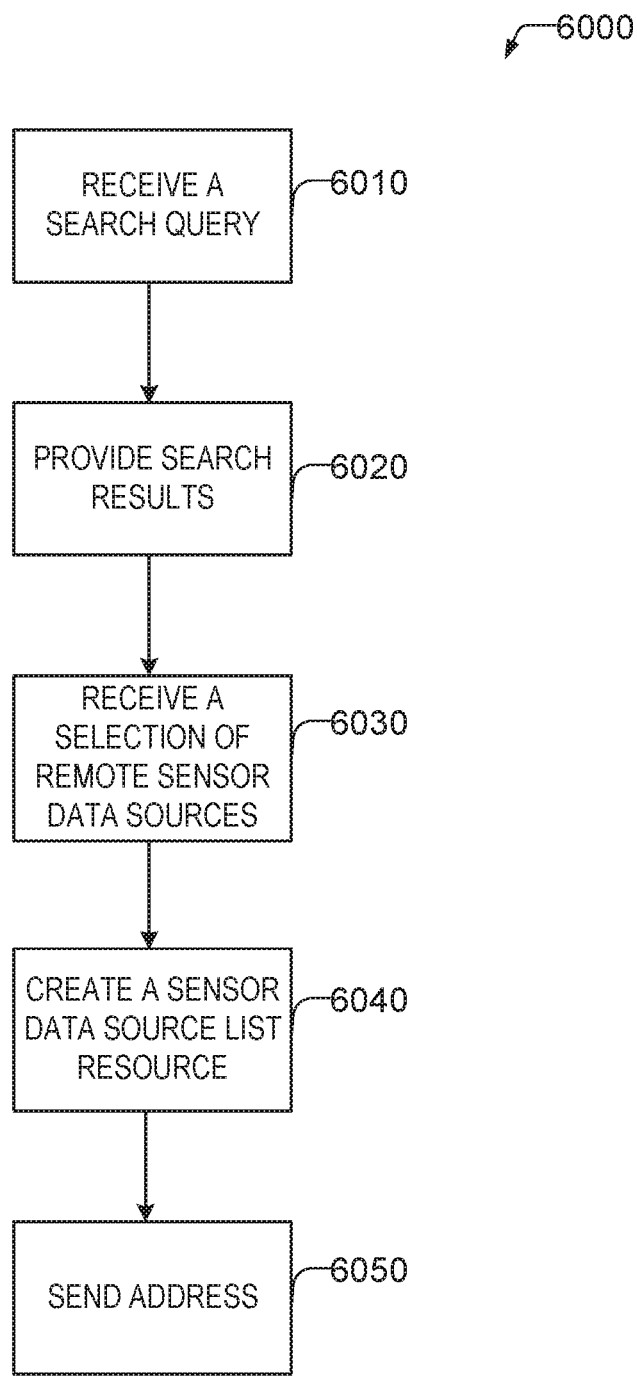
FIG. 6 shows a flowchart of a method of searching for sensor data and providing an address of a sensor data source list resource according to some examples of the present disclosure.

FIG. 6 shows a flowchart of a method 6000 of searching for sensor data and providing an address of a sensor data source list resource according to some examples of the present disclosure. At operation 6010 the IoT service receives a search query with search criteria. The search query may be entered through a GUI or from an API received from a computing device over a network (e.g., from a computing device executing an IoT application). The IoT service searches the sensor data source descriptors to determine data sources matching the criteria. At operation 6020 the IoT service provides the results to the entity that submitted the query. In some examples, if a spatially interpolated sensor data value or other composite signal (as described in the data quality discussion) would provide a higher quality weight, the interpolated sensor data value or other composite signal is provided as a search result. At operation 6030 the entity provides a selection of sensor data sources. In some examples, the entity may skip the search steps of 6010-6020 if they know which sensor data sources they are interested in. In response, at operation 6040 a sensor data source list resource is created and stored, and at operation 6050 a network address of this sensor data source list resource is sent to the requester entity. Additionally, in some examples, the IoT service also sends a description of the format of the requested data that can be utilized by the application developer to properly read any application results. In other examples, the IoT service returns other elements in addition to an address of the sensor data source list resource. For example, the IoT service may return information on the sensor data sources. In examples where the application requests a composite sensor reading, the IoT service may also return an executable script of interpreted code outlining the linear or non-linear translation between the composite sensor reading and the original sensor reading (s). In this way, if the IoT application already has local access to the relevant original sensor readings, it can reproduce the composite.

Figure 7:
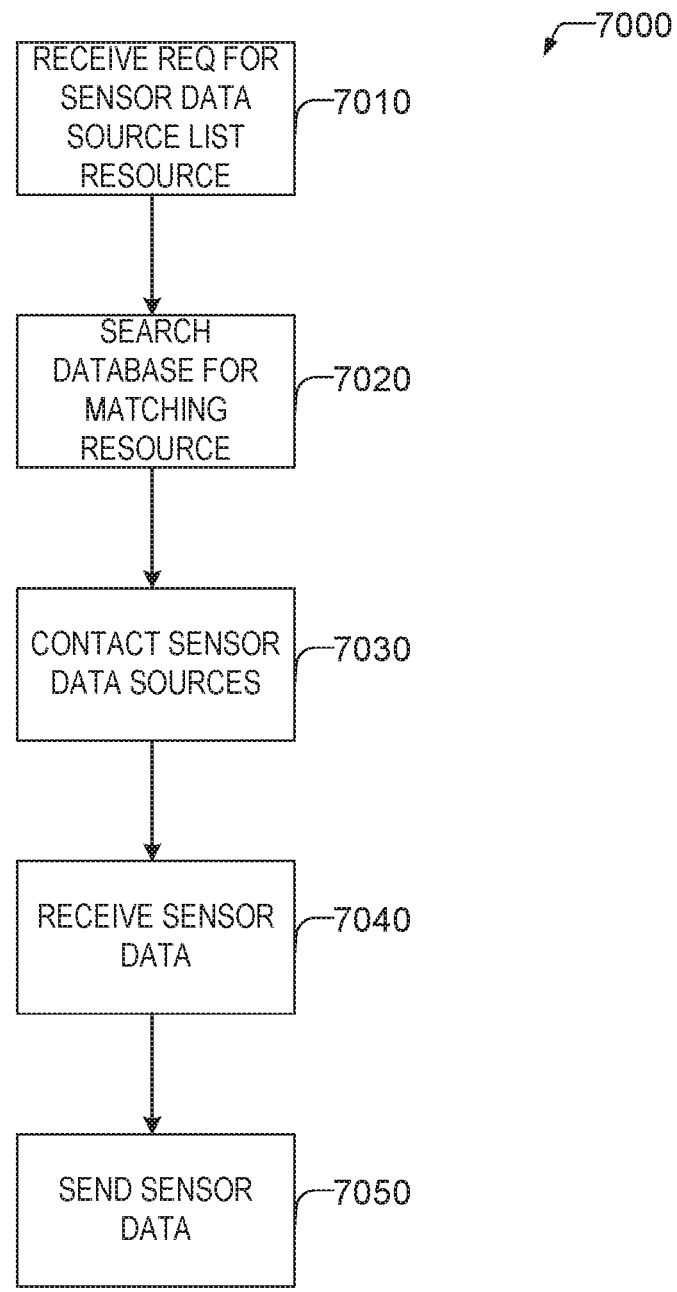
FIG. 7 shows a flowchart of a method of receiving a request for the sensor data source list resource and providing a response according to some examples of the present disclosure.

FIG. 7 shows a flowchart of a method 7000 of receiving a request for the sensor data source list resource and providing a response according to some examples of the present disclosure. At operation 7010, the IoT service receives a request for a sensor data source list resource at a particular address. The data store is searched for a matching resource at operation 7020. For example, the data store may be organized by address, such that the address pulls up the sensor data source list resource. The sensor data source list resource is then consulted to determine which sensor data sources to obtain data from. At operation 7030, the data sources are contacted to request the sensor data. This operation may not be necessary if the sensor data is in the cache. At operation 7040 the IoT service receives the sensor data from the data source. In some examples, the sensor data may be translated into a common format. At operation 7050 the IoT service sends the sensor data in the response to the request for the sensor data source list resource. In some examples the sensor data is sorted based upon the quality score and is in a standardized format. The sensor data source list resource, thus stores a list of the sensor data sources, and a request for the sensor data source list resource does not return the actual sensor data source list resource but rather the sensor data from the sensor data sources in a standardized format.

Figure 8:
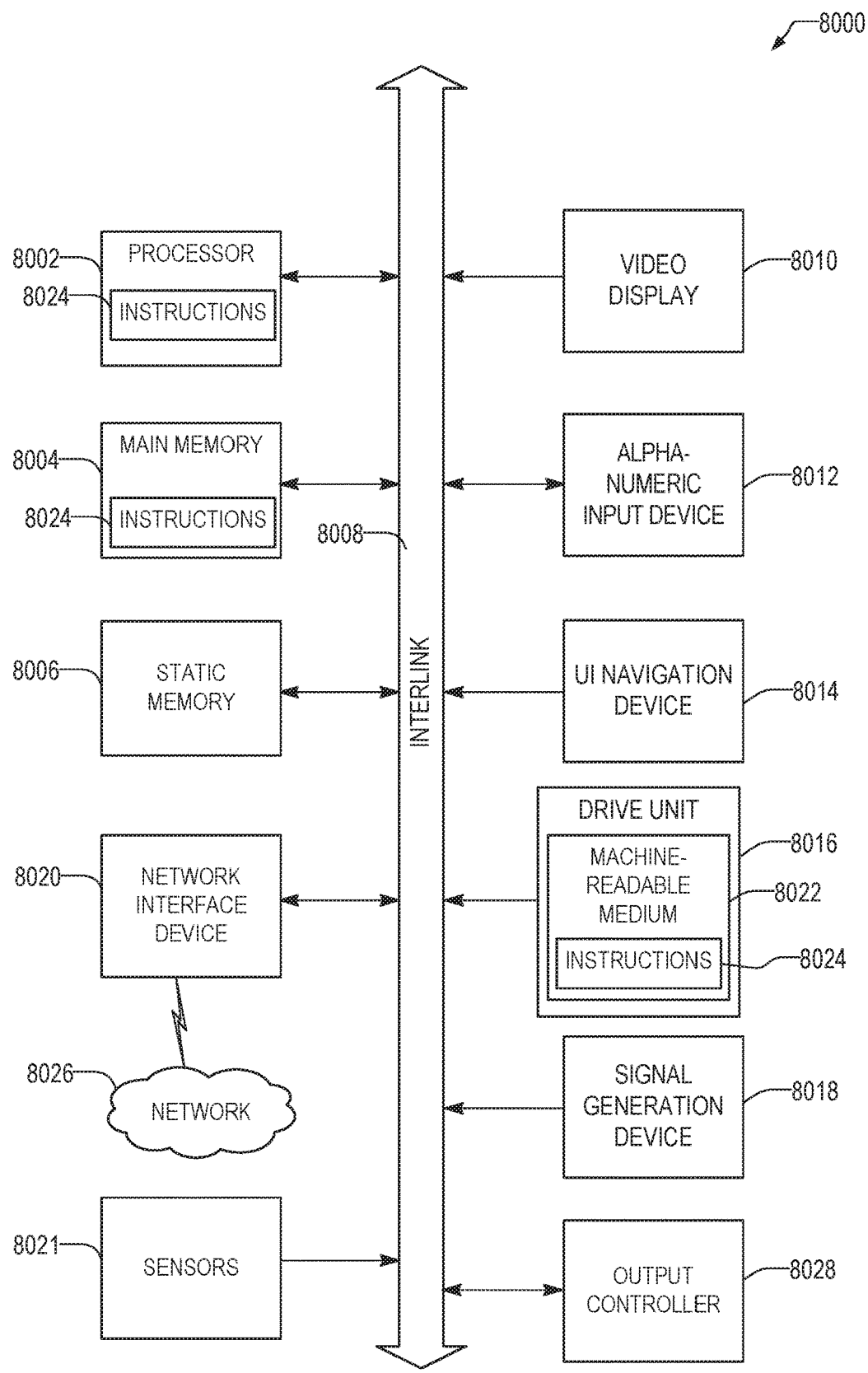
FIG. 8 is a block diagram illustrating an example of a machine upon which one or more embodiments may be implemented.

FIG. 8 illustrates a block diagram of an example machine 8000 upon which any one or more of the techniques (e.g., methodologies) discussed herein may perform. In alternative embodiments, the machine 8000 may operate as a standalone device or may be connected (e.g., networked) to other machines. In a networked deployment, the machine 8000 may operate in the capacity of a server machine, a client machine, or both in server-client network environments. In an example, the machine 8000 may act as a peer machine in peer-to-peer (P2P) (or other distributed) network environment. The machine 8000 may be a IoT sensor service, a server computer, an sensor data source, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 8000 may include a hardware processor 8002 (e.g., a central processing unit (CPU), a graphics processing unit (GPU), a hardware processor core, or any combination thereof), a main memory 8004 and a static memory 8006, some or all of which may communicate with each other via an interlink (e.g., bus) 8008. The machine 8000 may further include a display unit 8010, an alphanumeric input device 8012 (e.g., a keyboard), and a user interface (UI) navigation device 8014 (e.g., a mouse). In an example, the display unit 8010, input device 8012 and UI navigation device 8014 may be a touch screen display. The machine 8000 may additionally include a storage device (e.g., drive unit) 8016, a signal generation device 8018 (e.g., a speaker), a network interface device 8020, and one or more sensors 8021, such as a global positioning system (GPS) sensor, compass, accelerometer, or other sensor. The machine 8000 may include an output controller 8028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 8016 may include a machine readable medium 8022 on which is stored one or more sets of data structures or instructions 8024 (e.g., software) embodying or utilized by any one or more of the techniques or functions described herein. The instructions 8024 may also reside, completely or at least partially, within the main memory 8004, within static memory 8006, or within the hardware processor 8002 during execution thereof by the machine 8000. In an example, one or any combination of the hardware processor 8002, the main memory 8004, the static memory 8006, or the storage device 8016 may constitute machine readable media.

While the machine readable medium 8022 is illustrated as a single medium, the term "machine readable medium" may include a single medium or multiple media (e.g., a centralized or distributed database, and/or associated caches and servers) configured to store the one or more instructions 8024.

The term "machine readable medium" may include any medium that is capable of storing, encoding, or carrying instructions for execution by the machine 8000 and that cause the machine 8000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 8024 may further be transmitted or received over a communications network 8026 using a transmission medium via the network interface device 8020. The Machine 8000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 8020 may include one or more physical jacks (e.g., Ethernet, coaxial, or phone jacks) or one or more antennas to connect to the communications network 8026. In an example, the network interface device 8020 may include a plurality of antennas to wirelessly communicate using at least one of single-input multiple-output (SIMO), multiple-input multiple-output (MIMO), or multiple-input single-output (MISO) techniques. In some examples, the network interface device 8020 may wirelessly communicate using Multiple User MIMO techniques.

OTHER NOTES AND EXAMPLES

Example 1 is a method comprising: at a sensor service: receiving, over a network, from a requestor, a selection of a set of sensor data sources from a plurality of available sensor data sources, the set of sensor data sources communicating with the sensor service over the network using at least two different Application Programming Interfaces (APIs); creating a sensor data source list resource based on the selection; providing an address of the sensor data source list resource to the requestor; receiving, over the network, a request for the sensor data source list resource at the address; determining current sensor readings associated with the set of sensor data sources using the at least two different APIs; and providing, over the network, the current sensor readings associated with the set of sensor data sources in a response to the request for the sensor data source list resource.

In Example 2, the subject matter of Example 1 optionally includes receiving a search request including criteria, the criteria specifying characteristics of a desired remote sensor data source; and providing a list of the plurality of available sensor data sources that match the criteria, the list including the set of sensor data sources.

In Example 3, the subject matter of any one or more of Examples 1-2 optionally include wherein the address is a Universal Resource Locator (URL).

In Example 4, the subject matter of any one or more of Examples 1-3 optionally include monitoring a quality of sensor readings from the plurality of available sensor data sources; and assigning a quality score to each of the plurality of available sensor data sources based upon at least one of: a spatial correlation with other nearby data sources, an autocorrelation with historical data, and based upon determining deviations from a usual frequency of data updates.

In Example 5, the subject matter of Example 4 optionally includes wherein the providing the sensor readings associated with the set of sensor data sources comprises ordering sensor readings associated with the set of remote sensors based upon the quality score of each of the plurality of available sensor data sources.

In Example 6, the subject matter of any one or more of Examples 1-5 optionally include wherein providing the sensor readings associated with the set of sensor data sources comprises accessing a cache which stores the sensor readings associated with the set of sensor data sources.

In Example 7, the subject matter of any one or more of Examples 1-6 optionally include wherein providing the sensor readings associated with the set of sensor data sources comprises communicating over the network with at least one of the set of sensor data sources to obtain at least a portion of the data.

Example 8 is a machine readable medium comprising instructions, which when performed by a machine causes the machine to perform the operations comprising: at a sensor service: receiving, over a network, from a requestor, a selection of a set of sensor data sources from a plurality of available sensor data sources, the set of sensor data sources communicating with the sensor service over the network using at least two different Application Programming Interfaces (APIs); creating a sensor data source list resource based on the selection; providing an address of the sensor data source list resource to the requestor; receiving, over the network, a request for the sensor data source list resource at the address; determining current sensor readings associated with the set of sensor data sources using the at least two different APIs; and providing, over the network, the current sensor readings associated with the set of sensor data sources in a response to the request for the sensor data source list resource.

In Example 9, the subject matter of Example 8 optionally includes wherein the operations comprise: receiving a search request including criteria, the criteria specifying characteristics of a desired remote sensor data source; and providing a list of the plurality of available sensor data sources that match the criteria, the list including the set of sensor data sources.

In Example 10, the subject matter of any one or more of Examples 8-9 optionally include wherein the address is a Universal Resource Locator (URL).

In Example 11, the subject matter of any one or more of Examples 8-10 optionally include wherein the operations comprise: monitoring a quality of sensor readings from the plurality of available sensor data sources; and assigning a quality score to each of the plurality of available sensor data sources based upon at least one of: a spatial correlation with other nearby data sources, an autocorrelation with historical data, and based upon determining deviations from a usual frequency of data updates.

In Example 12, the subject matter of Example 11 optionally includes wherein the operations of providing the sensor readings associated with the set of sensor data sources comprises ordering sensor readings associated with the set of remote sensors based upon the quality score of each of the plurality of available sensor data sources.

In Example 13, the subject matter of any one or more of Examples 8-12 optionally include wherein the operations of providing the sensor readings associated with the set of sensor data sources comprises accessing a cache which stores the sensor readings associated with the set of sensor data sources.

In Example 14, the subject matter of any one or more of Examples 8-13 optionally include wherein the operations of providing the sensor readings associated with the set of sensor data sources comprises communicating over the network with at least one of the set of sensor data sources to obtain at least a portion of the data.

Example 15 is a system comprising: a processor; a memory communicatively coupled to the processor and comprising instructions, which when performed by the processor, cause the processor to perform operations comprising: receiving, over a network, from a requestor, a selection of a set of sensor data sources from a plurality of available sensor data sources, the set of sensor data sources communicating with the sensor service over the network using at least two different Application Programming Interfaces (APIs); creating a sensor data source list resource based on the selection; providing an address of the sensor data source list resource to the requestor; receiving, over the network, a request for the sensor data source list resource at the address; determining current sensor readings associated with the set of sensor data sources using the at least two different APIs; and providing, over the network, the current sensor readings associated with the set of sensor data sources in a response to the request for the sensor data source list resource.

In Example 16, the subject matter of Example 15 optionally includes wherein the operations comprise: receiving a search request including criteria, the criteria specifying characteristics of a desired remote sensor data source; and providing a list of the plurality of available sensor data sources that match the criteria, the list including the set of sensor data sources.

In Example 17, the subject matter of any one or more of Examples 15-16 optionally include wherein the address is a Universal Resource Locator (URL).

In Example 18, the subject matter of any one or more of Examples 15-17 optionally include wherein the operations comprise: monitoring a quality of sensor readings from the plurality of available sensor data sources; and assigning a quality score to each of the plurality of available sensor data sources based upon at least one of: a spatial correlation with other nearby data sources, an autocorrelation with historical data, and based upon determining deviations from a usual frequency of data updates.

In Example 19, the subject matter of Example 18 optionally includes wherein the operations of providing the sensor readings associated with the set of sensor data sources comprises ordering sensor readings associated with the set of remote sensors based upon the quality score of each of the plurality of available sensor data sources.

In Example 20, the subject matter of any one or more of Examples 15-19 optionally include wherein the operations of providing the sensor readings associated with the set of sensor data sources comprises accessing a cache which stores the sensor readings associated with the set of sensor data sources.

In Example 21, the subject matter of any one or more of Examples 15-20 optionally include wherein the operations of providing the sensor readings associated with the set of sensor data sources comprises communicating over the network with at least one of the set of sensor data sources to obtain at least a portion of the data.

Example 22 is a device comprising: at a sensor service: means for receiving, over a network, from a requestor, a selection of a set of sensor data sources from a plurality of available sensor data sources, the set of sensor data sources communicating with the sensor service over the network using at least two different Application Programming Interfaces (APIs); means for creating a sensor data source list resource based on the selection; means for providing an address of the sensor data source list resource to the requestor; means for receiving, over the network, a request for the sensor data source list resource at the address; means for determining current sensor readings associated with the set of sensor data sources using the at least two different APIs; and means for providing, over the network, the current sensor readings associated with the set of sensor data sources in a response to the request for the sensor data source list resource.

In Example 23, the subject matter of Example 22 optionally includes means for receiving a search request including criteria, the criteria specifying characteristics of a desired remote sensor data source; and means for providing a list of the plurality of available sensor data sources that match the criteria, the list including the set of sensor data sources.

In Example 24, the subject matter of any one or more of Examples 22-23 optionally include wherein the address is a Universal Resource Locator (URL).

In Example 25, the subject matter of any one or more of Examples 22-24 optionally include means for monitoring a quality of sensor readings from the plurality of available sensor data sources; and means for assigning a quality score to each of the plurality of available sensor data sources based upon at least one of: a spatial correlation with other nearby data sources, an autocorrelation with historical data, and based upon determining deviations from a usual frequency of data updates.

In Example 26, the subject matter of Example 25 optionally includes wherein the means for providing the sensor readings associated with the set of sensor data sources comprises means for ordering sensor readings associated with the set of remote sensors based upon the quality score of each of the plurality of available sensor data sources.

In Example 27, the subject matter of any one or more of Examples 22-26 optionally include wherein means for providing the sensor readings associated with the set of sensor data sources comprises means for accessing a cache which stores the sensor readings associated with the set of sensor data sources.

In Example 28, the subject matter of any one or more of Examples 22-27 optionally include wherein means for providing the sensor readings associated with the set of sensor data sources comprises means for communicating over the network with at least one of the set of sensor data sources to obtain at least a portion of the data.

What is claimed is:
1. A non-transitory machine readable medium comprising instructions, which when performed by a machine causes the machine to perform operations comprising:
  receiving, over a network, a search request from a requestor, the search request including criteria, the criteria specifying characteristics of a desired remote sensor data source;
  providing, to the requestor, a list of a plurality of available sensor data sources that match the criteria;
  receiving at a sensor service, over the network, from the requestor, a selection of a set of sensor data sources from the list of the plurality of available sensor data sources that match the criteria, the set of sensor data sources communicating with the sensor service over the network using at least two different Application Programming Interfaces (APIs);
  creating a sensor data source list resource based on the selection, the sensor data source list resource comprising the selection of the set of sensor data sources;
  storing the sensor data source list resource in a data store;
  assigning a numerical quality score to each particular available sensor data source from the plurality of available sensor data sources based upon a comparison of values from the particular available sensor data source with values from a subset of the plurality of available sensor data sources that are within a predetermined geographic distance to the particular available sensor data source, the numerical quality score quantifying a quality measurement of the particular available sensor data produced by the sensor data source;
  providing a network-address of the sensor data source list resource to the requestor;

receiving, over the network, a request for the sensor data source list resource at the address;
responsive to receiving, over the network, the request for the sensor data source list resource at the address, requesting, over the network, current sensor readings associated with each of the set of sensor data sources using the at least two different APIs; and
providing, over the network, the current sensor readings associated with the set of sensor data sources and corresponding quality scores of the set of sensor data sources in a response to the request for the sensor data source list resource sent over the network.

2. The non-transitory machine readable medium of claim 1, wherein the address is a Universal Resource Locator (URL).

3. The non-transitory machine readable medium of claim 1, wherein the operations of providing the sensor readings associated with the set of sensor data sources comprises ordering sensor readings associated with the set of sensor data sources based upon the quality score of each of the plurality of available sensor data sources.

4. The non-transitory machine readable medium of claim 1, wherein the operations of providing the sensor readings associated with the set of sensor data sources comprises accessing a cache which stores the sensor readings associated with the set of sensor data sources.

5. The non-transitory machine readable medium of claim 1, wherein the operations of providing the sensor readings associated with the set of sensor data sources comprises communicating over the network with at least one of the set of sensor data sources to obtain at least a portion of the data.

6. A system comprising:
a processor;
a memory communicatively coupled to the processor and comprising instructions, which when performed by the processor, cause the processor to perform operations comprising:
receiving, over a network, a search request from a requestor, the search request including criteria, the criteria specifying characteristics of a desired remote sensor data source;
providing, to the requestor, a list of a plurality of available sensor data sources that match the criteria;
receiving, over the network, from the requestor, a selection of a set of sensor data sources from the list of the plurality of available sensor data sources that match the criteria, the set of sensor data sources communicating over the network using at least two different Application Programming Interfaces (APIs);
creating a sensor data source list resource based on the selection, the sensor data source list resource comprising the selection of the set of sensor data sources;
storing the sensor data source list resource in a data store;
assigning a numerical quality score to each particular available sensor data source from the plurality of available sensor data sources based upon a comparison of values from the particular available sensor data source with values from a subset of the plurality of available sensor data sources that are within a predetermined geographic distance to the particular available sensor data source, the numerical quality score quantifying a quality measurement of the particular available sensor data produced by the sensor data source;
providing a network-address of the sensor data source list resource to the requestor;
receiving, over the network, a request for the sensor data source list resource at the address;
responsive to receiving, over the network, the request for the sensor data source list resource at the address, requesting, over the network, current sensor readings associated with the set of sensor data sources using the at least two different APIs; and
providing, over the network, the current sensor readings associated with the set of sensor data sources in a response to the request for the sensor data source list resource.

7. The system of claim 6, wherein the address is a Universal Resource Locator (URL).

8. The system of claim 6, wherein the operations of providing the sensor readings associated with the set of sensor data sources comprises ordering sensor readings associated with the set of sensor data sources based upon the quality score of each of the plurality of available sensor data sources.

9. The system of claim 6, wherein the operations of providing the sensor readings associated with the set of sensor data sources comprises accessing a cache which stores the sensor readings associated with the set of sensor data sources.

10. The system of claim 6, wherein the operations of providing the sensor readings associated with the set of sensor data sources comprises communicating over the network with at least one of the set of sensor data sources to obtain at least a portion of the data.

11. A method comprising:
at a sensor service:
receiving, over a network, a search request from a requestor, the search request including criteria, the criteria specifying characteristics of a desired remote sensor data source;
providing, to the requestor, a list of a plurality of available sensor data sources that match the criteria;
receiving, over the network, from the requestor, a selection of a set of sensor data sources from the list of the plurality of available sensor data sources that match the criteria, the set of sensor data sources communicating with the sensor service over the network using at least two different Application Programming Interfaces (APIs);
creating a sensor data source list resource based on the selection, the sensor data source list resource comprising the selection of the set of sensor data sources;
storing the sensor data source list resource in a data store;
assigning a numerical quality score to each particular available sensor data source from the plurality of available sensor data sources based upon a comparison of values from the particular available sensor data source with values from a subset of the plurality of available sensor data sources that are within a predetermined geographic distance to the particular available sensor data source, the numerical quality score quantifying a quality measurement of the particular available sensor data produced by the sensor data source;
providing a network-address of the sensor data source list resource to the requestor;
receiving, over the network, a request for the sensor data source list resource at the address;
responsive to receiving, over the network, the request for the sensor data source list resource at the address, requesting, over the network, current sensor readings associated with each of the set of sensor data sources using the at least two different APIs; and
providing, over the network, the current sensor readings associated with the set of sensor data sources and corresponding quality scores of the set of sensor data sources in a response to the request for the sensor data source list resource.

12. The method of claim 11, wherein the address is a Universal Resource Locator (URL).

13. The method of claim 11, wherein the providing the sensor readings associated with the set of sensor data sources comprises ordering sensor readings associated with the set of sensor data sources based upon the quality score of each of the plurality of available sensor data sources.

14. The method of claim 11, wherein providing the sensor readings associated with the set of sensor data sources comprises accessing a cache which stores the sensor readings associated with the set of sensor data sources.

15. The method of claim 11, wherein providing the sensor readings associated with the set of sensor data sources comprises communicating over the network with at least one of the set of sensor data sources to obtain at least a portion of the data.

* * * * *